UNITED STATES PATENT OFFICE.

PEDER FARUP, OF GLÖSHAUGEN, NEAR TRONDHJEM, NORWAY, ASSIGNOR TO DET NORSKE AKTIESELSKAB FOR ELEKTROKEMISK INDUSTRI, OF CHRISTIANIA, NORWAY.

PROCESS OF PRODUCING SULFURIC ACID.

1,219,277.        Specification of Letters Patent.        Patented Mar. 13, 1917.

No Drawing.     Application filed February 25, 1913. Serial No. 750,568.

*To all whom it may concern:*

Be it known that I, PEDER FARUP, a subject of the King of Norway, residing at Glöshaugen, near Trondhjem, Norway, have invented certain new and useful Improvements in Processes of Producing Sulfuric Acid; and I do hereby declare the following to be a full, clear, and exact description of the invention, such as will enable others skilled in the art to which it appertains to make and use the same.

This invention has for its object to provide a process for the manufacture of sulfuric acid according to the contact method.

In the manufacture of sulfuric acid according to the contact process platinum in one form or another has wholly or partly been employed. The employment of this contact substance has the weakness however that its action is very considerably reduced by the action of some of the impurities of ordinary roaster gases.

This necessitates on the one hand intricate processes for purifying the roaster gases and on the other hand also from time to time the purification of the platinum mass employed. In order to avoid these drawbacks various other contact substances having a catalytic action upon the reaction in question, have been proposed and also to some extent employed. Such materials are oxid of iron, earth metals and a variety of other oxid compounds including also titanium oxids alone and mixed with one or more other oxids. Such contact materials are for instance mentioned in the British patent specification No. 1385 of 1901. These contact substances are in action however behind platinum which to an eminent degree is in the possession of the property of accelerating the formation of sulfur trioxid and thus also of sulfuric acid from sulfur dioxid.

The applicant has now found that the mineral ilmenite, which occurs in nature, and which is a chemical compound of the oxygen compounds of titanium and iron is in a very prominent degree suitable for the production of a contact material for use in the sulfuric acid manufactures. Thus it has been found that finely divided ilmenite ore after having been treated with sulfuric acid in the manner below stated is in possession of catalytic properties in a high degree and in a higher degree than is the case with oxids of iron or titanium or mixtures of both.

A material suitable for a contact substance is produced by finely dividing an iron titanium oxid, such as ilmenite in its natural state, and adding 1 to 2 parts of concentrated sulfuric acid whereby a violent reaction accompanied by an effervescence of the mass will take place either of itself or by a slight heating, and a rigid porous mass will thus be formed.

This sulfate mass is thereupon divided into suitable pieces and is employed as such as a contact material or it may first be heated up to 700°–900°, whereby the sulfuric acid is again removed.

Instead of employing as an initial material the natural ilmenite ores any other titaniferous iron ores may be employed, in which case it may be suitable to remove from the ores by dressing a greater or smaller part of other minerals or gangue accompanying the ilmenite ore.

I claim:

1. The process of producing sulfuric acid, which comprises passing sulfur dioxid and oxygen over a contact mass of a double oxid of iron and titanium.

2. The process of producing sulfuric acid, which comprises conducting oxygen and a gas containing sulfur dioxid over a heated catalyst consisting of residues remaining from the heat decomposition of sulfated ilmenite.

In testimony that I claim the foregoing as my invention, I have signed my name in presence of two subscribing witnesses.

PEDER FARUP.

Witnesses:
MELITA OPPEDAL,
JOHN KNUDSEN.